United States Patent [19]

Loren

[11] Patent Number: 4,462,640

[45] Date of Patent: Jul. 31, 1984

[54] PLASTIC SIMULATED WIRE WHEEL COVER

[75] Inventor: Norman Loren, Warren, Mich.

[73] Assignee: Michael Ladney, Jr., Grosse Pointe Shores, Mich.

[21] Appl. No.: 512,109

[22] Filed: Jul. 8, 1983

Related U.S. Application Data

[63] Continuation of Ser. No. 258,577, Apr. 29, 1981, abandoned.

[51] Int. Cl.³ .............................................. B60B 7/04
[52] U.S. Cl. .................................. 301/37 P; 301/37 SS
[58] Field of Search ............................ 301/37 SS, 37 P

[56] References Cited

U.S. PATENT DOCUMENTS

| | | | |
|---|---|---|---|
| 2,713,518 | 7/1955 | Lyon | 301/37 SS |
| 2,713,519 | 7/1955 | Lyon | 301/37 SS |
| 3,145,059 | 8/1964 | Hemstreet | 301/37 SS |
| 4,009,911 | 3/1977 | Apczynski | 301/37 SS |
| 4,275,930 | 6/1981 | Kamihama | 301/37 SS |
| 4,364,608 | 12/1982 | Ookubo et al. | 301/37 SS |

FOREIGN PATENT DOCUMENTS

| | | | |
|---|---|---|---|
| 2902846 | 8/1979 | Fed. Rep. of Germany ... | 301/37 SS |
| 1429114 | 3/1976 | United Kingdom ............ | 301/37 SS |

Primary Examiner—Charles A. Marmor
Attorney, Agent, or Firm—Barnes, Kisselle, Raisch, Choate, Whittemore & Hulbert

[57] ABSTRACT

A plastic simulated wire wheel cover includes at least two molded plastic components secured together by suitable fasteners. Each component has radially extending spokes which may be molded integrally therewith. One of the spoked components includes a radially outwardly extending, annular flange around its outer periphery adapted to overlie or extend adjacent to the outer peripheral portion of a wheel rim when the cover is applied to the wheel. The wheel-engaging members for releasably mounting the cover on a wheel are mounted directly on the plastic molded component provided with the radial annular peripheral flange.

1 Claim, 22 Drawing Figures

PLASTIC SIMULATED WIRE WHEEL COVER

This is a continuation of application Ser. No. 258,577, filed Apr. 29,1981, now abandoned.

This invention relates to plastic wheel covers and, more particularly, to simulated wire wheel covers molded from plastic.

A conventional simulated wire wheel cover normally incorporates a multiplicity of wire-like spokes aligned in two or more separate individual planes or conical surfaces in order to achieve an authentic depth appearance of a wire wheel. The manufacture and assembly of a simulated wire wheel cover having independently formed spokes is time consuming and expensive. This is particularly true where the spokes of one set are in crossing relation with the spokes in another set. This is true regardless of whether the spokes are arranged in crossing relation in only an axial plane or, in more authentic wheel covers, in both an axial plane and in the radial plane of the wheel. In addition, such metal covers have a tendency to rattle.

In recent years attempts have been made to mold a simulated wire wheel cover from plastic in order to avoid the time and expense of assemblying individual spokes to the spoke supporting members. Such plastic wheel covers have been molded as a single piece wheel cover or a wheel cover comprising several members connected together by some suitable means. In order to achieve an authentic appearance, a one-piece molded plastic cover which simulates a wire wheel requires the use of a very complicated and costly mold. Wheel covers formed of two or more plastic components have also been proposed, but experience has shown that the connection between the various components of the cover are frequently unduly stressed by the force required to apply and remove the cover from the vehicle wheel.

The present invention has for its primary object the provision of a simulated wire wheel cover molded from plastic which is authentic in appearance, economical to manufacture, and rugged in construction.

A more specific object of the invention is to provide a wheel cover of the type described which employs two or more plastic molded spoke wheel components which are fastened together and arranged so that the means fastening the components together are not stressed when the cover is removed from or applied to a wheel.

Another object of the present invention is to provide a simulated wire wheel cover formed of at least two separately molded plastic components, one of the components comprising a radially outer annular member provided with a peripheral flange and also provided with means for mounting the cover on a wheel. With such an arrangement the cover is adapted to be mounted on or removed from a wheel by applying a force to the peripheral flange on the annular member which also supports the wheel cover retention arrangement.

A further object of the present invention is to provide a wheel cover of the type described which incorporates at least two sets of spokes in crossing relation molded integrally with two separate components that are secured together in a simple manner to impart to the cover an authentic depth appearance characteristic of a conventional vehicle wire wheel.

The wheel cover of the present invention generally comprises two or more molded plastic components, each having radially extending spokes thereon arranged so that when the components are assembled an authentic appearance of a wire wheel is presented. One of the components of the cover is molded with a radially outwardly extending annular peripheral flange which, when the cover is applied to a vehicle wheel, overlies or extends adjacent to the outer peripheral portion of the wheel rim. Resilient wheel engaging members for releasably retaining the cover on the wheel are mounted directly on the component provided with the radially outer extending flange so that when a force is applied to the flange for removing or mounting the cover on the wheel the fasteners which secure the components together are not stressed.

Other objects, features and advantages of the present invention will become apparent from the following description and accompanying drawings, in which.

Figure 1:
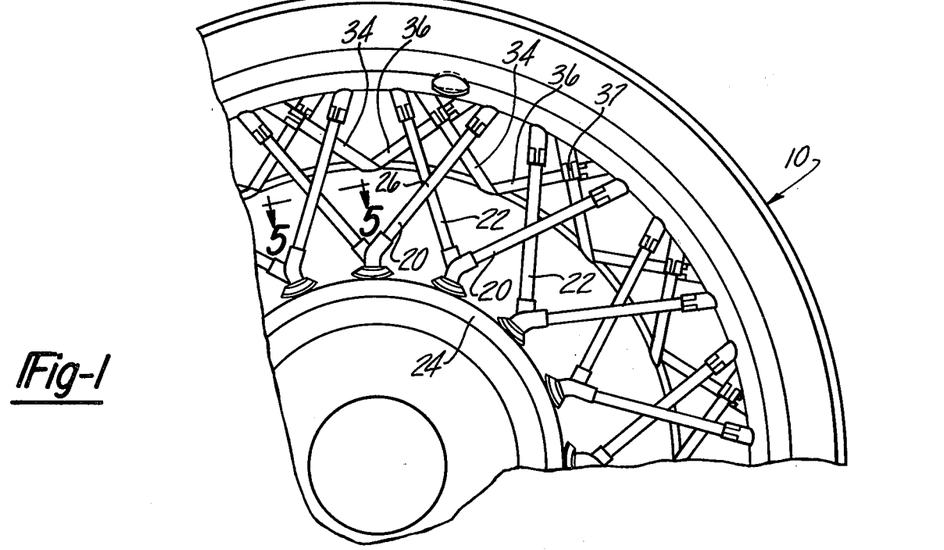
FIG. 1 is a fragmentary plan view of the outboard face of one form of wheel cover according to the present invention.
Figure 2:
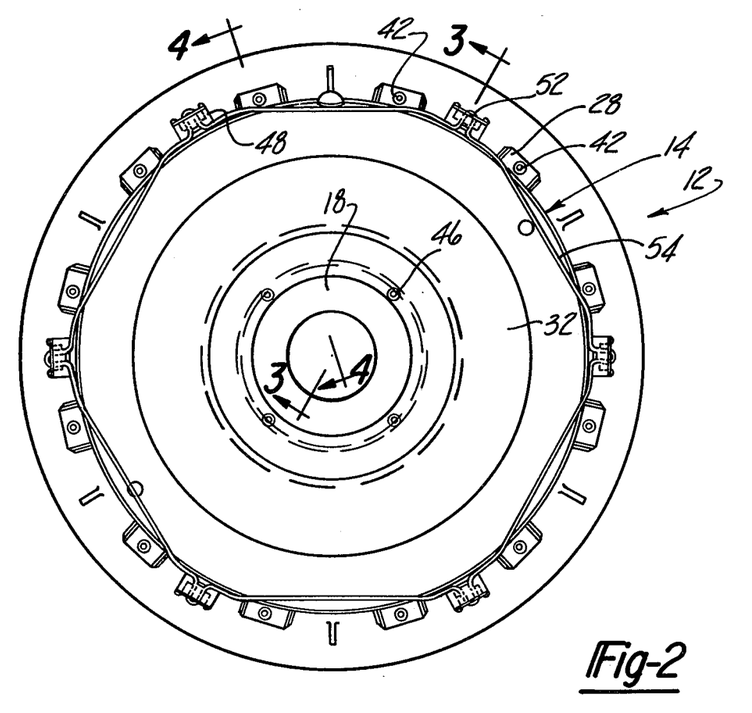
FIG. 2 is a rear plan view of the wheel cover shown in FIG.1.
Figure 3:
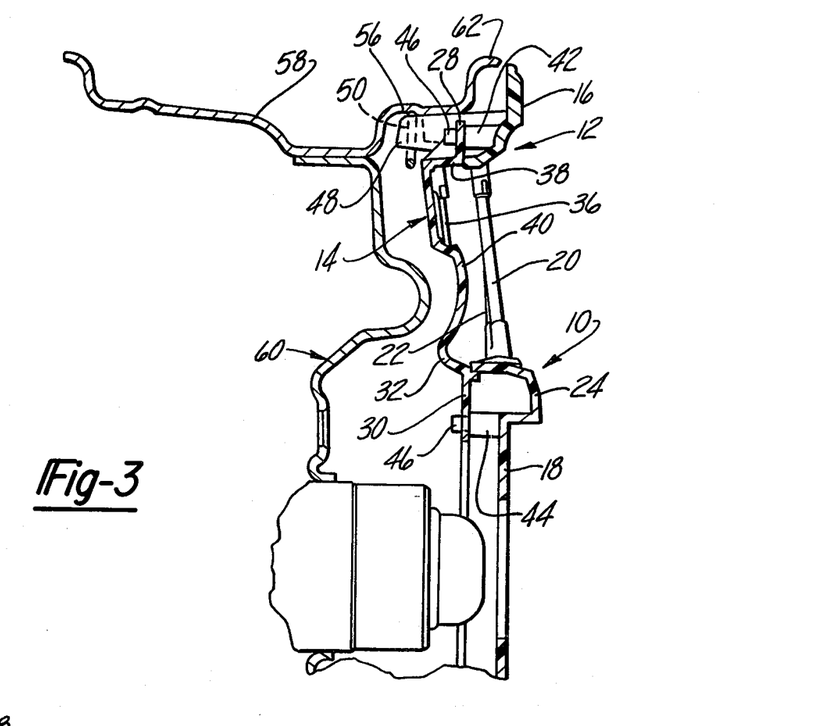
FIG. 3 is a fragmentary sectional view along the line 3—3 in FIG. 2 and showing the wheel cover mounted on a vehicle wheel.
Figure 4:
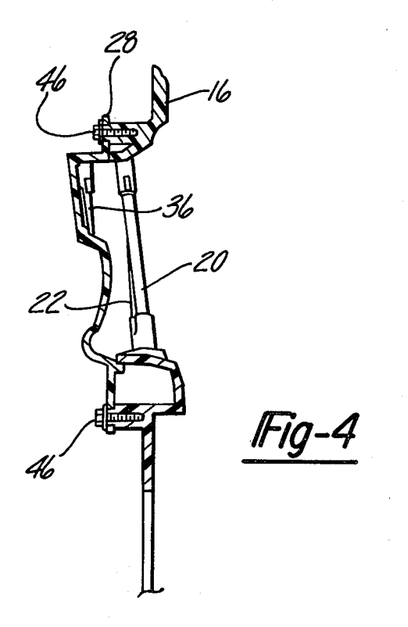
FIG. 4 is a fragmentary sectional view along the line 4—4 in FIG. 2.
Figure 5:
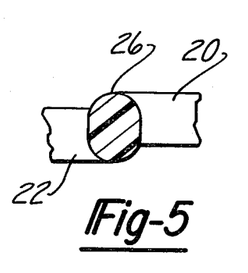
FIG. 5 is a fragmentary sectional view along the line 5—5 in FIG. 1.

Referring first to FIGS. 1 through 5, and particularly to FIG. 3, the wheel cover 10 shown therein is comprised of two molded plastic members; namely, an axially outer member 12 and an axially inner member 14. The axially outer member 12 has an outer peripheral flange 16 and an annular central hub 18 which are spaced apart radially and interconnected by spokes 20, 22. The spokes 20, 22 are molded integrally with the flange 16 and hub 18. The spokes 20, 22 are arranged circumferentially in successive pairs with the spokes of each pair diverging radially outwardly from an annular section 24 of central hub 18. At the annular section 24 spokes 20, 22 have their axes spaced apart slightly in a direction axially of the wheel cover so that the radially inner end of spoke 20 is spaced axially outwardly slightly from the inner end of spoke 22. The outer ends of these spokes connect with the flange 16 of member 12 in generally the same axial plane. However, the spokes 20, 22 of adjacent pairs intersect as at 26 so that the axis of each spoke 20 is spaced slightly axially outwardly from the axis of spoke 22 at the intersection 26.

The axially inner component 14 of the wheel cover comprises a radially outer flange 28 and a radially inner flange 30 connected by a radially extending web 32. A plurality of pairs of crossing spokes 34, 36 are molded integrally with web 32. At their radially outer ends spokes 34,36 intersect as at 37 and merge with an annular rib 38 extending axially inwardly from the outer flange 28 and at their radially inner ends spokes 34,36 converge and merge with an annular hump 40 in web 32. The degree of divergence of spokes 20,22 and of spokes 34,36 and their circumferential spacing is such that, when the two components 12,14 of the wheel cover are secured together, the spokes 20,22 are in crossing relation with respect to the spokes 34,36 when the cover is viewed axially as in FIG. 1. This crossing relation of the spokes and the axial spaces of spokes 20,22 relative to the spokes 34,36 imparts to the wheel cover an authentic appearance of a wire wheel. This can be further enhanced by suitable decorating that can be applied to the cover. For example, the spokes themselves can be chrome plated while the web 32 and other portions of the cover can be painted in any desired color.

At regularly circumferentially spaced points around the inboard face of flange 16, the flange is molded with axially inwardly extending lugs 42. Similar lugs 44 are molded on the inboard face of hub 18. The inner member 14 is secured flatwise against the inner ends of these lugs by fasteners 46.

The inboard face of flange 16 is also provided with a second series of circumferentially spaced lugs 48 which extend axially inwardly beyond lugs 42. Each lug 48 has a radially extending passageway 50 therein in which a U-shaped projection 52 extends radially outwardly. Projections 52 are formed around a resilient wire ring 54 and are adapted to releasably engage an annular surface 56 on a rim 58 of a vehicle wheel 60. The wheel cover retention arrangement shown and described herein is similar in design to and functions in the same manner as that shown in U.S. Pat. No. 4,027,919, dated June 7, 1977.

When it is desired to remove the cover from the wheel, a prying tool is inserted between the outer edge of flange 16 and the adjacent edge portion 62 of the wheel rim. It will be observed that when the cover is pried off the wheel in this manner, the pry-off force is transmitted from flange 16 directly to the adjacent lugs 48 to displace the projections 52 radially inwardly and thereby release the cover from the wheel. None of the cover application and removal forces are transmitted to the axially inner member 14 of the wheel cover and, accordingly, the connections between the members 12 and 14 provided by the fasteners 46 are not significantly stressed when the wheel cover is applied to or removed from the wheel. It will also be appreciated that the lugs 48 which support the resilient wire ring 54 are located directly adjacent the outer periphery of flange 16. Thus, the force applied to flange 16 for mounting the cover on the wheel and for removing the cover from the wheel are transmitted substantially directly to lug 48. Since these lugs are of relatively heavy construction, the application and removal forces applied to flange 16 do not tend to distort the wheel cover to any substantial extent.

Figure 6:
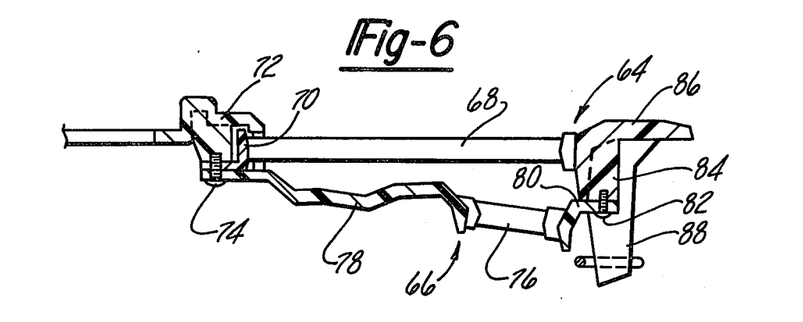
FIGS. 6 and 7 are fragmentary sectional views similar to FIG. 4 and showing slight modifications thereof.

In the modified cover shown in FIG. 6 the axially outer member is designated 64 and the axially inner member of the cover is designated 66. The spokes 68 on the outer member 64 may have the same general configuration and arrangement as the spokes 20,22 on the cover illustrated in FIGS. 1 through 5. However, in the arrangement shown in FIG. 6 the inner ends of spokes 68 are molded integrally with an annular member 70 that is secured to a separate central hub member 72 by screws 74. The spokes 76 on the inner member 66 may have the same configuration and arrangement as the spokes 34,36 of the wheel cover shown in FIGS. 1 through 5. However, the web 78 of the inner member 66 terminates around its outer periphery at the inner ends of spokes 76. The outer ends of spokes 76 are molded integrally with a flanged annular section 80 secured by a plurality of fasteners 82 to the axially inner ends of lugs 84 molded integrally with the outer flange 86 of cover member 64. The wheel cover retention lugs 88 are also formed integrally with the outer flange 86 of the outer member 64 and function in the same manner as the lugs 48 previously described.

Figure 7:
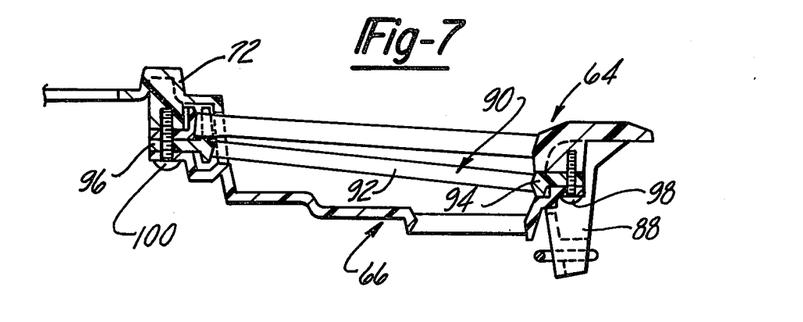

The wheel cover shown in FIG. 7 differs from that shown in FIG. 6 primarily in that a third member 90 is disposed axially intermediate the outer member 64 and the inner member 66. The intermediate member 90 has a plurality of spokes 92, the radially outer ends of which are molded integrally with a peripheral flange 94 and the radially inner ends of which are molded integrally with an annular flange 96. The three members of the cover are secured together around the outer periphery of the cover by screws 98 and around their inner periphery these members are secured to the hub portion 72 by screws 100.

The wheel cover 102 illustrated in FIGS. 8 through 12 generally comprises two members 104 and 106. The member 104 is generally in the form of a round disc having an outer peripheral flange 108 and a central hub portion 110 connected by a radially extending web 112. A plurality of spokes 114,116 are molded integrally with web 112. A plurality of circumferentially spaced openings 118 are formed in web 112 between the adjacent sets of spokes 114,116. A plurality of circumferentially spaced cover retaining lugs 120, similar to the retaining slug previously described, are formed integrally with the outer flange 108.

Figures 8, 9, 10, 11, 13:
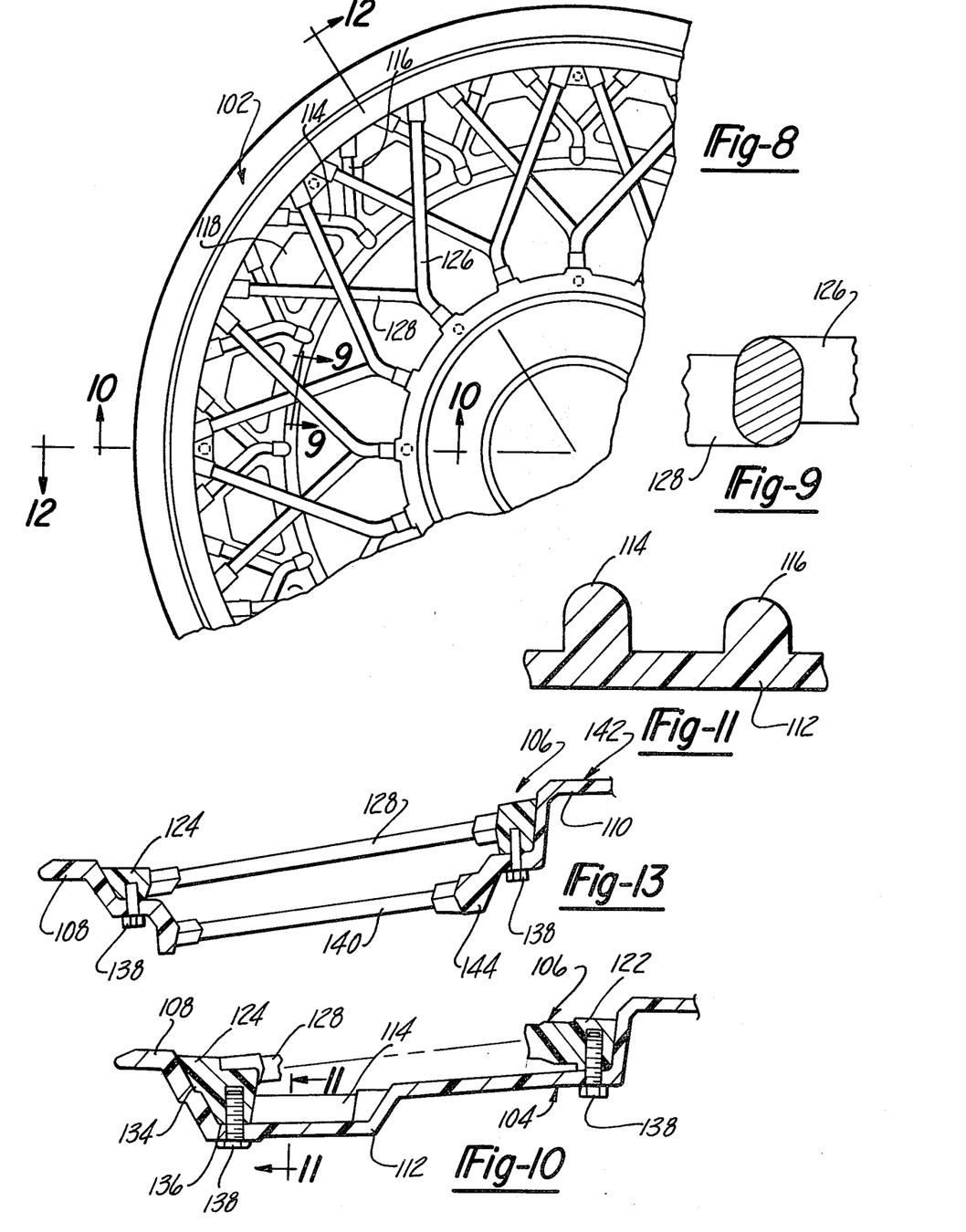
FIG. 8 is a fragmentary plan view of the outboard face of another form of wheel cover according to the present invention.
FIG. 9 is a fragmentary sectional view along the line 9—9 in FIG. 8.
FIG. 10 is a fragmentary sectional view along the line 10—10 in FIG. 8.
FIG. 11 is a fragmentary sectional view along the line 11—11 in FIG. 10.
FIG. 13 is a fragmentary sectional view similar to FIG. 10 and showing a slight modification thereof.
Figures 12, 16:
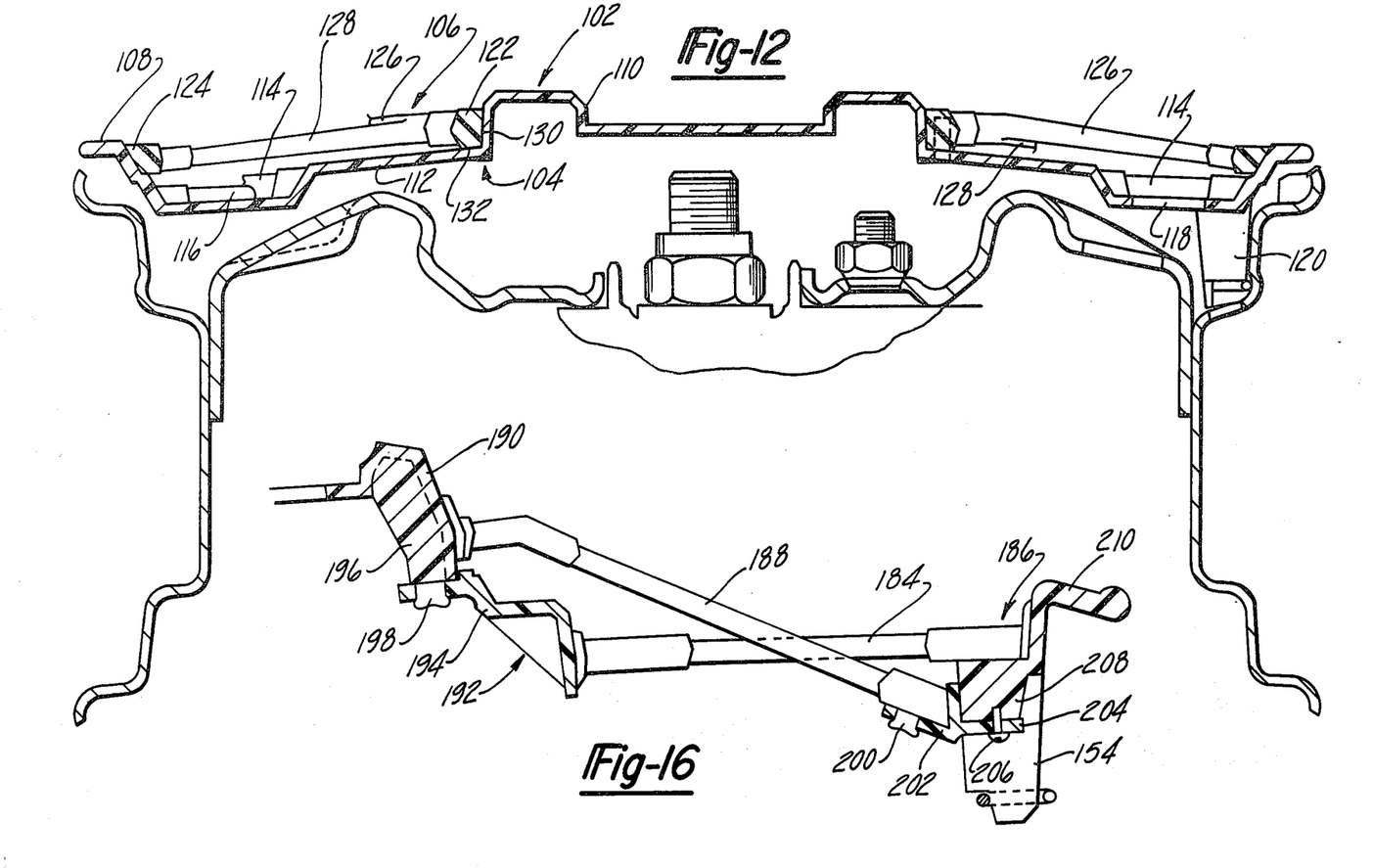
FIG. 12 is a sectional view along the line 12—12 in FIG. 8 and showing the wheel cover mounted on a vehicle wheel.
FIG. 16 is a fragmentary sectional view similar to FIG. 15 and showing a slight modification thereof.

The member 106 of wheel cover 102 comprises radially spaced inner and outer portions rims 122,124 molded integrally with the respective inner and outer ends of spokes 126,128. The inner rim member 122 has axially and radially extending faces 130,132 respectively designed to interfit with correspondingly shaped surfaces on the hub 110 and web 112 of member 104. Likewise, the outer rim member 124 has an axially inclined face 134 and a radially extending face 136 designed to seat against correspondingly shaped surfaces on the outer flange 108 and web 112 of cover member 104. The two members 104,106 are secured together by a plurality of screws 138 (FIG. 10). Thus, on cover 102 the member 106 is generally in the shape of a wheel having inner and outer rims connected by radially extending spokes, the inner and outer rims being shaped and dimensioned to nest snugly with annular seats formed on the other member 104. In this arrangement it will be noted that the member 104 on which the retention lugs 120 are formed is a relatively rigid member since the outer peripheral flange 108 and the central hub portion 110 are interconnected by a fairly rigid web 112. As is true of the previous embodiments described and illustrated, the force applied to the cover for mounting it on and removing it from a wheel are transmitted directly from flange 108 to retention lugs 120. Thus, the connections between the two members of the cover secured by screws 138 are not stressed by these cover application and removal forces.

The embodiment illustrated in FIG. 13 is very similar to that illustrated in FIGS. 8 through 12 and differs therefrom primarily in that the spokes 140 on the member 142 have their radially inner ends molded integrally with an annular section 144 directly adjacent the central hub 110. The outer member 106 is substantially the same as that described with respect to FIGS. 8 through 12 and is connected to the inner member 142 in the same manner.

Figure 14:
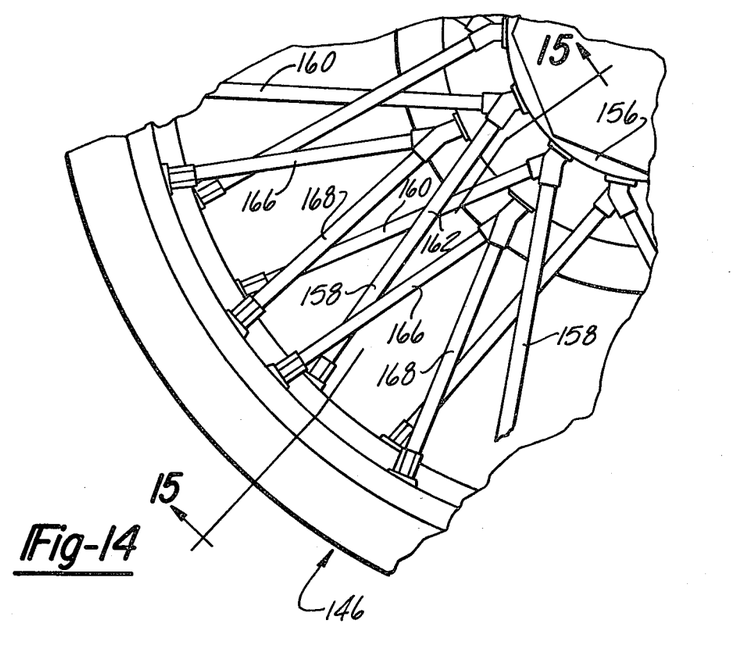
FIG. 14 is a fragmentary plan view of the outboard face of another wheel cover according to the present invention.
Figure 15:
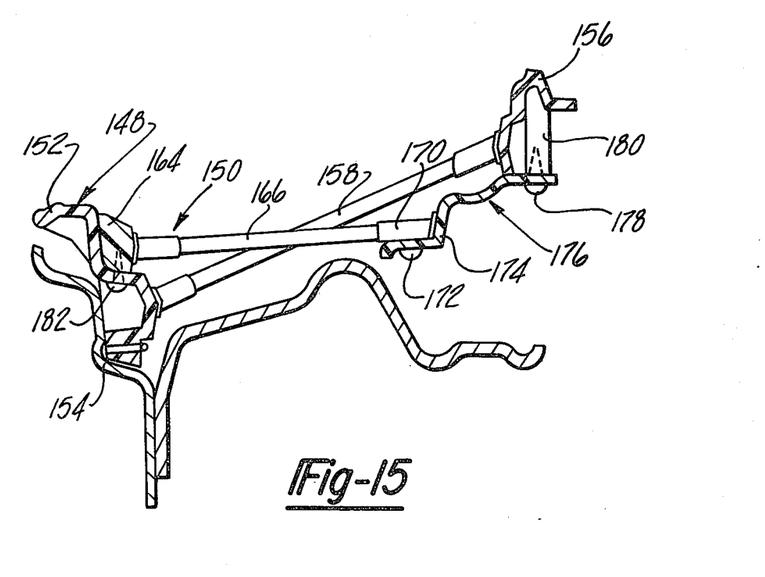
FIG. 15 is a fragmentary sectional view along the line 15—15 in FIG. 14.

From the standpoint of appearance the wheel cover 146 illustrated in FIGS. 14 and 15 differs from the embodiments previously described in that the spokes of the two basic members of the cover are in crossing relation when the cover is viewed in plan and also when viewed in a radial direction. A most authentic wire wheel appearance is thus presented. Cover 146 generally comprises two spoked members 148,150. The member 148 has an outer peripheral flange 152, on the inboard side of which are molded retention lugs 154. Member 148 also has a central hub portion 156. The outer flange 152 and hub portion 156 are interconnected by integrally molded spokes 158,160 which diverge in a direction axially inwardly and radially outwardly from hub portion 156 to outer flange 152. The divergence and the circumferential spacing of the adjacent pairs of spokes 158,160 is such that they cross and intersect as at 162 in a manner similar to the intersection 26 illustrated in FIG. 5.

The outer rim 164 of cover member 150 is molded integrally with the outer ends of successive pairs of spokes 166,168 which converge in a radially inward direction. Spokes 166,168 lie generally in the axial plane of the cover and at their inner covering ends 170 they are secured by suitable fasteners 172 to the axially extending flange 174 of a third member 176 which is in turn secured by fasteners 178 to circumferentially spaced lugs 180 on the hub portion 156 of cover member 148. The outer peripheral rim 164 of member 150 is secured to the flanged outer periphery of member 148 by fasteners 182.

The cover illustrated in FIG. 16 differs only slightly from that shown in FIGS. 14 and 15. In the arrangement shown in FIG. 16, the spokes 184 on the cover member 186 on which the retention lugs 154 are formed lie in generally the radial plane of the wheel. However, the spokes 188 molded integrally with the hub portion 190 of the other cover member 192 incline axially inwardly and radially outwardly so as to be in crossing relation with the spokes 184. The inner annular section 194 of cover member 192 is heat staked to the inner ends of lugs 196 on hub portion 190 as at 198. The radially outer ends of the inclined spokes 188 are heat staked as at 200 to an annular flange 202 formed on a third member 204 which is secured by screws 206 to the inner ends of lugs 208 molded integrally with the outer flange portion 210 of cover member 186. In many application heat staking the cover members together is adequate since the connections between the cover members are not stressed when the cover is applied to or removed from the vehicle wheel. Spokes 184,188 are in crossing relation both when viewed axially and radially similar to the spokes illustrated in FIG. 14.

Figure 17:
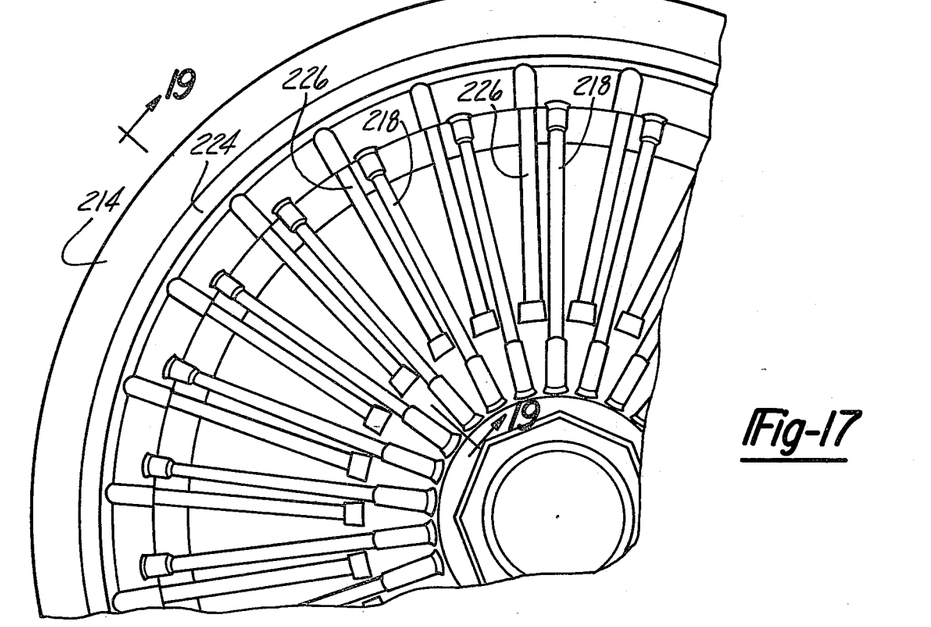
FIG. 17 is a fragmentary plan view of the outboard face of another form of wheel cover according to the present invention.
Figure 18:
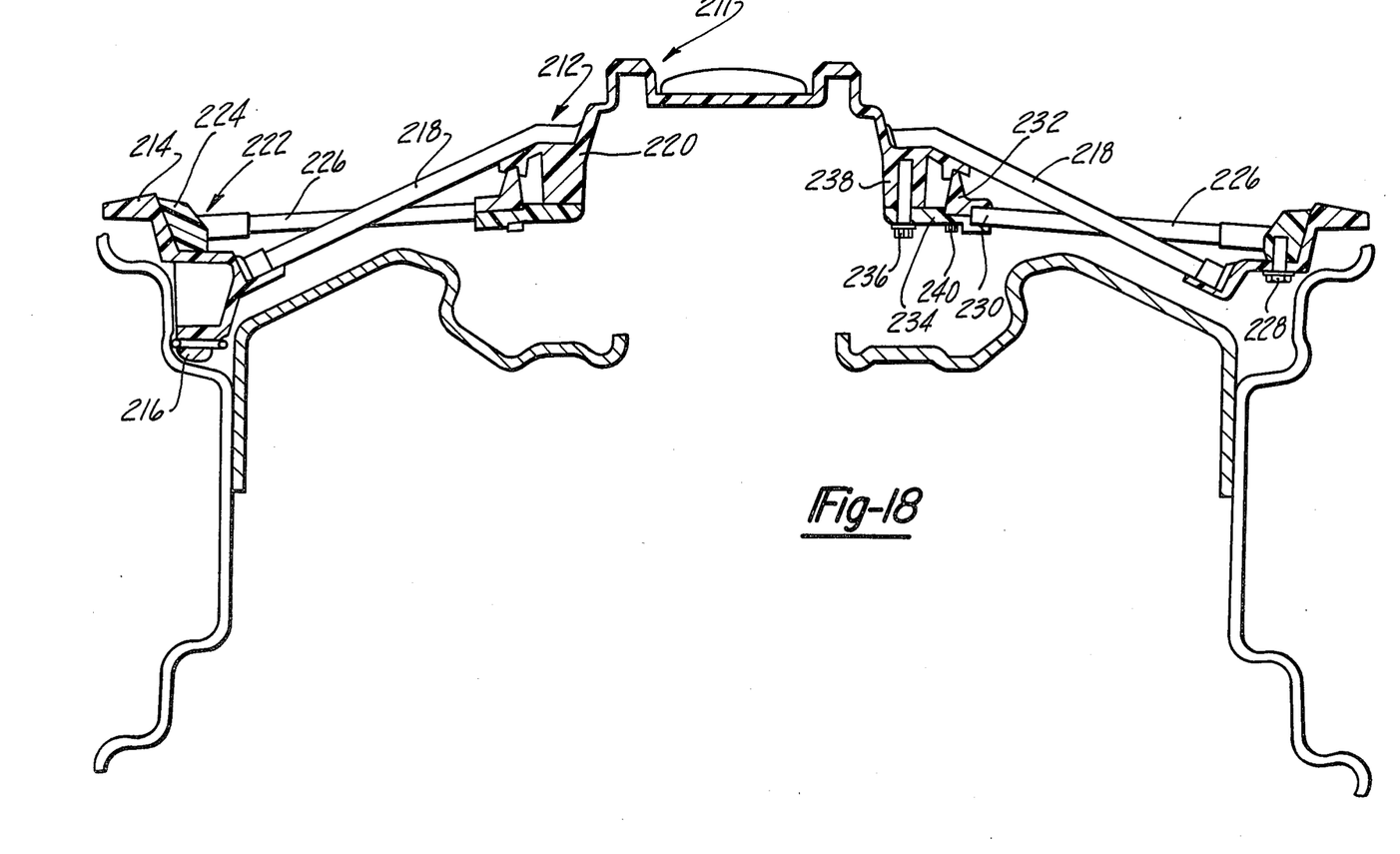
FIG. 18 is a sectional view along the line 18—18 in FIG. 17 and showing the wheel cover mounted on a vehicle wheel.
Figure 19:
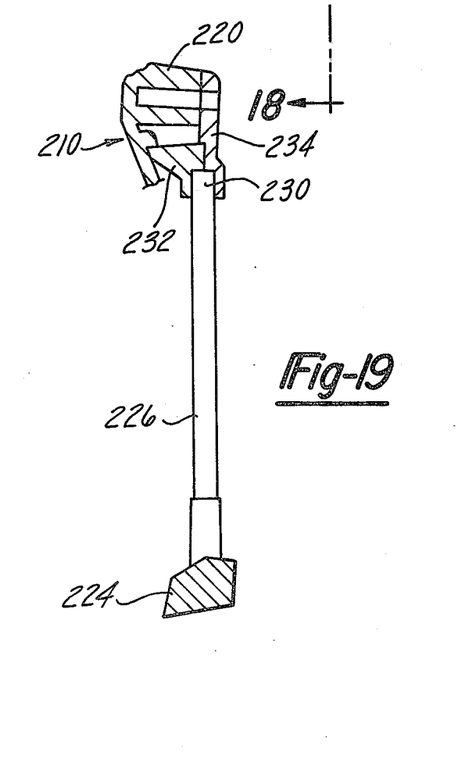
FIG. 19 is a fragmentary sectional view of one of the components of the wheel cover shown in FIG. 17 and taken along the line 19—19.

In the arrangement illustrated in FIGS. 17 through 19 the cover, which is generally indicated as 211, consists generally of four members rather than two or three members as previously described. The cover member 212, provided with the outer peripheral flange 124 on the inboard face of which are molded the retention lugs 216, has a plurality of spokes 218 which incline radially inwardly and axially outwardly to a central hub section 220 molded integrally therewith. The second member 222 of the wheel cover has an outer peripheral rim 224 seated on the flange portion 214 of member 212 and a plurality of radially inwardly extending spokes 226 which lie in generally the axial plane of the cover. Rim 224 is secured to the flange portion 214 by screws 228. The radially inner free ends 230 of spokes 226 are engaged within sockets formed in annular retainer members 232,234. Retainer 234 is secured around its inner periphery by screws 236 to lugs 238 on the axially inner side of hub section 220. Retainer 232 is in turn connected with retainer 234 by screws 240.

In assembling the cover 211 illustrated in FIGS. 17 through 19 the cover member 222 is first secured to the cover member 212 around its outer periphery by screws 228. Thereafter, the annular retainer 232 is inclined to the axial plane of the cover at the rear side thereof in a slightly eccentric position and is manipulated so as to overlie the front side of about half of the spokes 226. After retainer 232 is so positioned around the front side of about one half of the spokes, it can be tilted into the plane of the cover so as to flex the remaining spokes and thus be disposed on the front side of all of the spokes 226. Retainer 232 can then be secured to retainer 234 by screws 240 and retainer 234 in turn can be secured to the lugs 238 by screws 236.

Figure 20:
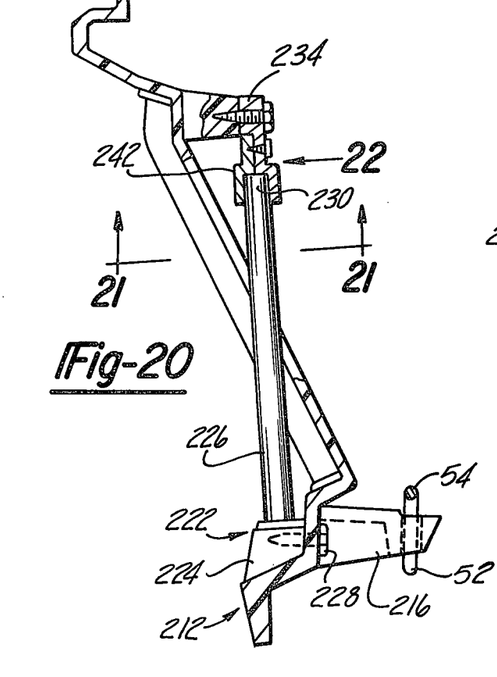
FIG. 20 is a fragmentary sectional view of another form of wheel cover which is slightly modified as compared with the cover shown in FIGS. 17 through 19.
Figure 21:
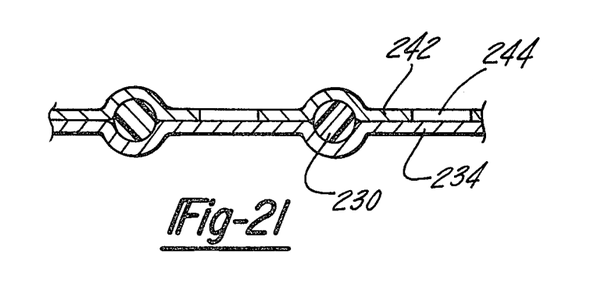
FIG. 21 is a sectional view along the line 21—21 in FIG. 20.
Figure 22:
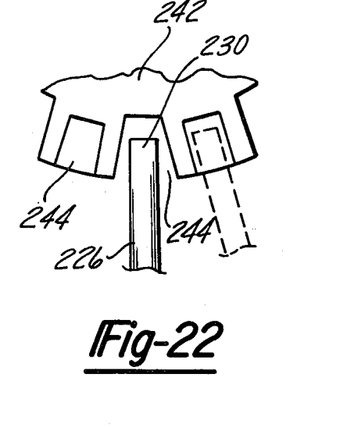
FIG. 22 is a fragmentary view showing one step in the assembly of the cover shown in FIG. 20 and taken in the direction of arrow 22 in FIG. 20.

The wheel cover modification shown in FIGS. 20 through 22 differs from that shown in FIGS. 17 through 19 primarily in the configuration of the annular retainer member 242 which cooperates with retainer member 234 to enclose the inner free ends 230 of spokes 226. Retainer 242 is formed with a plurality of radial notches 244 around its outer periphery which are spaced apart circumferentially to correspond with the circumferential spacing between the inner ends of the adjacent spokes 226. The notches 244 facilitate the placement of retainer 242 on the front side of the inner ends of spokes 226. Retainer 242 is initially oriented circumferentially so that the notches 244 are radially aligned with the inner ends of spokes 226. In this orientation it is passed through the spokes 226 from the rear side thereof and thereafter rotated slightly so as to align the notches 244 therein with the ends 230 of spokes 226. Thereafter, retainer 242 can be fastened to retainer 234 by screws 240 and retainer 234 can be secured to the hub portion of cover member 212 by screws 236.

In each of the embodiments illustrated it will be noted that the retention lugs which support the resilient wire ring 54 are molded integrally with the cover member provided with the outer peripheral flange to which force is applied when the cover is mounted on or removed from a vehicle wheel. It should be appreciated, however, that the specific cover retention arrangement illustrated and described is only one of many which may be employed for releasably mounting a wheel cover on a vehicle wheel. For example, a sheet metal ring provided with resilient fingers or claws for frictionally gripping a wheel rim may be employed in place of the wire ring and lugs shown and described herein. In the cover of this invention it is important that the cover retention means, whatever form they may be, are mounted directly on the cover member which includes the outer peripheral flange to which force is applied for mounting the cover on or removing it from the vehicle wheel. This is an important feature of the present invention since the wheel cover includes at least two separate sets of spokes lying in different axial planes. These axially spaced sets of spokes impart an authentic wire wheel look to the cover and, as a practical matter, must be formed on two separately molded plastic members which must be secured together to provide the finished wheel cover.

It will be appreciated that in each of the embodiments shown and described the members which, when assembled, form the finished wheel cover are shaped so as to be molded from plastic in an economical manner, thus avoiding the use of constly intricate molds. For example, the wheel cover embodiments illustrated in FIGS. 8 through 13 are comprises essentially of two pieces, one of which has a conventional "wagon wheel" configuration consisting of radially spaced inner and outer rims interconnected by radially extending spokes.

I claim:

1. A vehicle wheel cover which simulates a wire wheel comprising, first and second molded plastic members of circular shape secured together in axially juxtaposed relation, said first member having a circumferentially continuous annular section around the outer periphery thereof, said annular section having means thereon for frictionally retaining the cover on a vehicle wheel, said first member also having an axially outwardly projecting, rigid, circular cylindrical central hub, said hub including an axially outwardly extending, annular surface and a radially extending annular surface at the axially outer edge thereof, means including spokes extending radially between and integrally molded with said annular section and said central hub to rigidly interconnect the same, said annular section having an annular seat extending around the inner periphery thereof, said seat having an axially outwardly facing, radially extending surface and a radially inwardly facing and axially inclined annular surface, said hub also having an annular seat around the outer periphery thereof which includes an axially outwardly facing, radially extending surface and a radially outwardly facing, axially inclined annular surface, the radially extending surfaces of said seats being spaced apart axially and also being spaced axially outwardly from said spokes, said hub and annular section each having a second axially inclined, annular surface extending continuously around and molded integrally with the adjacent ends of the spokes, said second member comprising a pair of radially spaced concentric annular rims interconnected by radial spokes molded integrally therewith, each rim having at the axially inner face thereof a radially extending surface, the outer rim having around its outer periphery an axially extending annular surface similarly inclined to the axially extending surface of the seat on said annular section, said inner rim having around its inner periphery an axially extending surface similarly inclined to the axially extending surface of the seat on said hub, the radially extending surfaces on said rims being seated against the radially extending surfaces on said seats and the axially inclined surfaces on said rims being seated with a radially close fit against the axially inclined surfaces of the seats to positively locate both rims of the second member on the respective seats of the first member in both axial and radial directions, each rim also having an axially outwardly facing, radially extending surface which forms in part the visible, axially outer face of the wheel cover, said hub projecting axially outwardly through the axially outer face of said inner rim, and means interconnecting said rims with said first member at said seats.

* * * * *